US005562533A

United States Patent [19]

[11] Patent Number: 5,562,533

[45] Date of Patent: Oct. 8, 1996

Gallagher

[54] TUNA CHUNKING APPARATUS

[76] Inventor: William Gallagher, 438 Hermit St., Philadelphia, Pa. 19128

[21] Appl. No.: 546,823

[22] Filed: Oct. 23, 1995

[51] Int. Cl.[6] .................................................. A22C 25/18

[52] U.S. Cl. .......................................... 452/149; 30/279.2

[58] Field of Search .................................. 452/149, 144; 30/279.2, 124; 83/167

[56] References Cited

U.S. PATENT DOCUMENTS

| | | | |
|---|---|---|---|
| 307,100 | 10/1884 | Clother | 452/144 |
| 2,720,157 | 10/1955 | Harrison | 452/144 |
| 3,578,048 | 5/1971 | von Duyke | 83/109 |
| 4,579,028 | 4/1986 | Neidhardt | 83/109 |
| 5,303,472 | 4/1994 | Mbanugo | 30/279.2 |

*Primary Examiner*—Willis Little

[57] ABSTRACT

A tuna chunking apparatus including a base portion that has a base front end and a base back end with a handle. The base front end has a pair of hinged extensions. The base portion has a base top and a base bottom with an opening. The base bottom is positioned on a chum bucket. The opening of the base portion has a front wall, a back wall, with a pair of side walls that have six rigid blades with a space between each blade. Included is a plate that has a plate front end and a plate back end with a handle. The plate front end has three hinged extensions that are capable of interlocking with a pair of hinged extensions of the base portion. The plate has a plate top with five rectangular projections and a front projection, with each projection proportionally spaced from another projection. Lastly, the handle of the plate is capable of rotating the plate toward the base portion along the hinges to force a fish positioned on the base top to be chunked by the blades.

10 Claims, 2 Drawing Sheets

TUNA CHUNKING APPARATUS

BACKGROUND OF THE INVENTION

1. Field of the Invention

The present invention relates to a tuna chunking apparatus and more particularly pertains to allowing a fish to be chunked therein when the tuna chunking apparatus is placed in the operable configuration and further allowing the fish to be chunked by the blades when the projections are forced between the spaces of the blade.

2. Description of the Prior Art

The use of fish cutting devices is known in the prior art. More specifically, fish cutting devices heretofore devised and utilized for the purpose of cutting fish into chumb bait are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,332,593 to Goto, Tsujii, Okada and Suzuki discloses a method of producing minced fish meat. U.S. Pat. No. 5,226,334 to Pegoraro discloses an automatic cutting of meat and fish into portions. U.S. Pat. No. 5,205,778 to Korkuch discloses an apparatus for chopping fish for chumb bait and method. U.S. Pat. No. 4,794,670 to Savastano, Jr. discloses a fish chunk-cutting device. U.S. Pat. No. 4,476,610 to Wenzel discloses a method and apparatus for transversely cutting fish. Lastly, U.S. Pat. No. 3,439,721 to Christiansen discloses a machine for cutting bait fish.

While these devices fulfill their respective, particular objectives and requirements, the aforementioned patents do not describe tuna chunking apparatus that allows a tuna chunking apparatus that has a base portion that is positionable on a chum bucket and has a press plate that can be rotated towards the base portion to push the fish through blades of the base portion for chunking of the fish.

In this respect, the tuna chunking apparatus according to the present invention substantially departs from the conventional concepts and designs of the prior art, and in doing so provides an apparatus primarily developed for the purpose of the fish to be chunked by the blades when the projections are forced between the spaces of the blade.

Therefore, it can be appreciated that there exists a continuing need for a new and improved tuna chunking apparatus which can be used for the fish to be chunked by the blades when the projections are forced between the spaces of the blade. In this regard, the present invention substantially fulfills this need.

SUMMARY OF THE INVENTION

In view of the foregoing disadvantages inherent in the known types of fish cutting devices now present in the prior art, the present invention provides an improved tuna chunking apparatus. As such, the general purpose of the present invention, which will be described subsequently in greater detail, is to provide a new and improved tuna chunking apparatus and method which has all the advantages of the prior art and none of the disadvantages.

To attain this, the present invention essentially comprises a generally rectangular base portion. The base portion has a base front end and a base back end with a generally rectangular handle extending therefrom. The base front end has a pair of cylindrical hinged extension extending therefrom. The base portion has a length of about thirteen inches, and a width of about eleven inches, and a height of about three to four inches. The base portion has a base top and base bottom with a generally rectangular opening therethrough. The opening encompasses about seventy-five percent of the base top and the base bottom to leave a border. The border covers twenty-five percent of a surface of the base top and the base bottom. The border has a width that is one and one half inch from any end of the base portion to the opening. The base bottom of the base portion is positionable on a chum bucket. The opening of the base portion has a front wall, a back wall, and a pair of side walls therebetween. The side wall have six rigid blades extending therebetween. The six rigid blades have a space between each blade. One of each blade is proportionally spaced from the front wall and another blade. One of each blade is proportionately spaced from the back wall and another blade. Each blade has a height extending from the base top to the base bottom with a height being equal the height of the base portion. The handle of the base portion has a handle end with a generally oblong hole adjacent thereto. Also, included is generally rectangular press plate. The press plate has a plate front end and a plate end with a generally rectangular handle extending therefrom. The plate front end has three cylindrical hinged extensions extending therefrom. The cylindrical hinged extensions of the plates are capable of interlocking with the pair of cylindrical hinged extensions of the base portion, and being secured thereto with a pivot pin. The press plate has a length of about thirteen inches, and a width of about eleven inches and a height of about three to four inches. The press plate has a plate top and plate bottom. The plate top has five generally rectangular projections and a front projection extending therefrom. Each projection is proportionately spaced from another projection. The front projection is proportionally spaced from the plate front end. One of each projection is proportionately spaced from the plate back end. Each of the five projections have a height of about three to four inches and a width of about one inch. The front projection being of equal height with each of the five projections. The front projection having a decreasing width with an interior wall sloping away from another of the five projections. The projections covering about seventy-five percent of the plate top and leaving a border. The border of the plate covers twenty-five percent of a surface area of the plate top. The border has a width of one and one half inch from any end of the press plate to any one of the projections. The handle of the plate has a handle end with a generally oblong hole adjacent thereto. The handle of the plate is used to assist the plate in rotating at the interlocking hinges towards the base portion. When the press plate is rotated towards the base portion the projections are positioned between the spaces of each blade. The projection force a fish positioned on the base top to chunked by the blades when the projection is forced between the spaces of each blade.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tuna chunking apparatus which has all of the advantages of the prior art fish cutting devices and none of the disadvantages.

It is another object of the present invention to provide a new and improved tuna chunking apparatus which may be easily and efficiently manufactured and marketed.

It is further object of the present invention to provide a new and improved tuna chunking apparatus which is of durable and reliable constructions.

An even further object of the present invention is to provide a new and improved tuna chunking apparatus which is susceptible of a low cost of manufacture with regard to both materials and labor, and which accordingly is then susceptible of low prices of sale to the consuming public, thereby making such tuna chunking apparatus economically available to the buying public.

Still yet another object of the present invention is to provide a new and improved tuna chunking apparatus which provides in the apparatuses and methods of the prior art some of the advantages thereof, while simultaneously overcoming some of the disadvantages normally associated therewith.

Even still another object of the present invention is to provide a tuna chunking apparatus for allowing a fish to be chunked therein when the tuna chunking apparatus is placed in the operable configuration and further allowing the fish to be chunked by the blades when the projections are forced between the spaces of the blade.

Lastly, it is an object of the present invention to provide a new and improved tuna chunking apparatus that includes a base portion. The base portion has a base front end and a base end with a handle extending therefrom. The base front end has a pair of hinged extensions extending therefrom. The base portion has a base top and a base bottom with an opening therethrough. The base portion with its base bottom is positioned on a chum bucket. The opening of the base portion has a front wall and a back wall with a pair of side walls having six blades with a space between each blade. Included is a plate. The plate has a plate front end and plate back end with a handle extending therefrom. The plate front end has three cylindrical hinged extensions extending therefrom that are capable of interlocking with a pair of cylindrical hinged extensions of the base portion. The plate has a plate top with five rectangular projections and a front projection extending therefrom. Each projection is proportionately spaced from another projection. Lastly, the handle of the plate is used to rotate the plate towards the base portion at the interlocking hinges. Rotating the plate will cause the projections to move in a direction of the base portion where a fish is positioned thereon. The projection will press against the fish and cause the fish to be chunked by the blades when the plate moves towards the base portion. The projections are further forced between the spaces of each blade.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
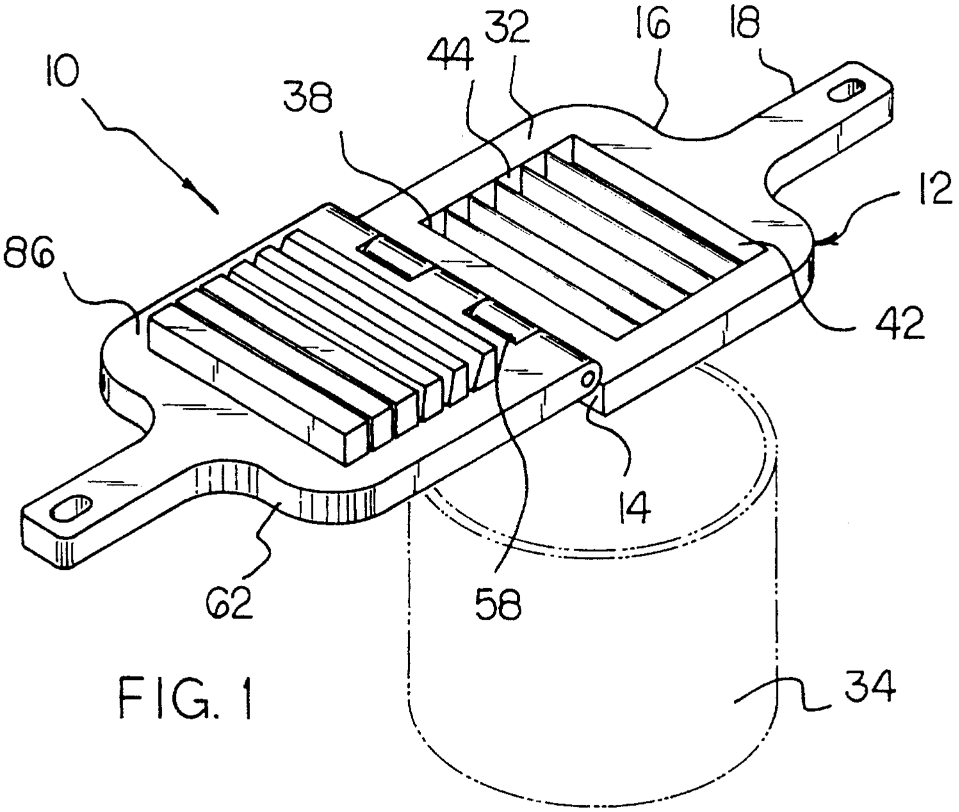
FIG. 1 is a perspective view of the preferred embodiment of the tuna chunking apparatus constructed in accordance with the principles of the present invention.

With reference now to the drawings, and in particular to FIG. 1 thereof, the preferred embodiment of the new and improved tuna chunking apparatus embodying the principles and concepts of the present invention and generally designated by the reference numeral 10 will be described.

The present invention, the tuna chunking apparatus 10 is comprised of a plurality of components. Such components are Such components in their broadest context include a base portion, a press plate, blades, and projections individually configured and correlated with respect to each other so as to attain the desired objective.

Figure 2:
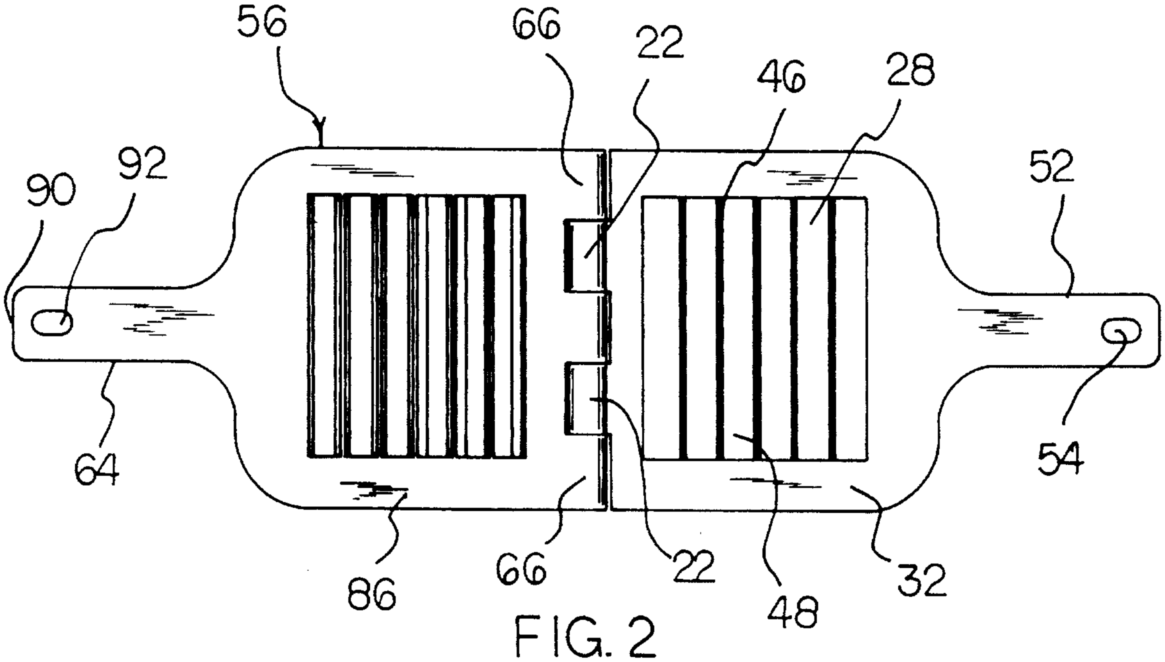
FIG. 2 is a top plan view of the preferred embodiment of the present invention.

Specifically, the present invention includes a generally rectangular base portion 12, as shown in FIG. 1. The base portion has a base front end 14, a base back end 16, with a generally rectangular handle 18 extending therefrom. The base front end has a pair of cylindrical hinged extensions 22 extending therefrom. The base portion is formed of a metal that is rust resistant. The base portion has a length of about thirteen inches, and a height of about three to four inches. The base portion has a base top 24 and a base bottom 26 with a generally rectangular opening 28 therethrough. The opening, as shown in FIG. 2, encompasses about seventy-five percent of the base top and the base bottom to leave a border 32. The border covers twenty-five percent of a surface area of the base top and the base bottom. The border has a width that is one and one half inch from any end of the base portion to the opening. The base portion has its base bottom positioned on a chum bucket 34.

The opening 28 of the base portion 12 has a front wall 38 and a back wall 42 with a pair of side walls 44 therebetween. The side walls have six rigid blades 46 extending therebetween. The six blades are formed of stainless steel and sharp on each surface side. The six rigid blades have a space 48 between each blade 46. One of each blade is proportionately spaced from the front wall and another blade. One of each blade is proportionately spaced from the back wall and another blade. Each blade has a height extending from the base top 24 to the base bottom 26 with the height equal the height of the base portion. The handle has a handle end 52 with a generally oblong hole 54 adjacent thereto.

Figure 3:
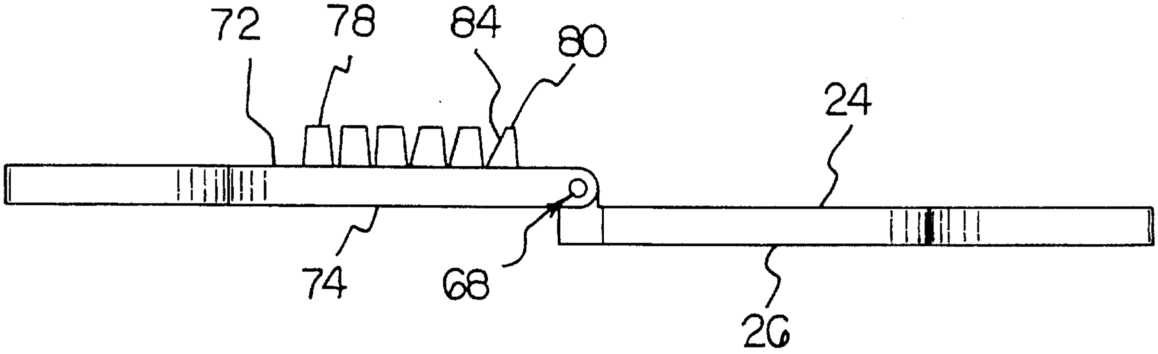
FIG. 3 is a side view of the preferred embodiment of the present invention.

As illustrated in FIG. 2, a generally rectangular press plate 56 is included. The press plate is formed of metal. The press plate has a plate front end 58 and a plate back end 62 with a generally rectangular handle 64 extending therefrom. The plate front end 58 has three cylindrical hinged extensions 66 extending therefrom. The cylindrical hinged extensions of the plate 56 are capable of interlocking with a pair of cylindrical hinged extension 22 of the base portion 12. Each of the cylindrical hinged extensions are secured together with a pivot pin 68. The press plate has a length of about thirteen inches, and a width of about eleven inches, and a height of about three to four inches. The press plate has a plate top 72 and a plate bottom 74, as shown in FIG. 3. The plate top has five generally rectangular projections 78 and a front projection 80 extending therefrom.

As best illustrated in FIG. 3, each projection is propornately spaced from another projection. The front projection is propornately spaced from the plate front end 58. One of each projections is propornately spaced from the plate back end 62. Each of the five projections have a height of about three to four inches and width of about one inch. The front projection has a height equal to that of each of the five projections. The front projection has a decreasing width with an interior wall 84 sloping away from another of the five projections. The projections cover about seventy-five percent of the plate's top leaving a border 86.

Figure 4:
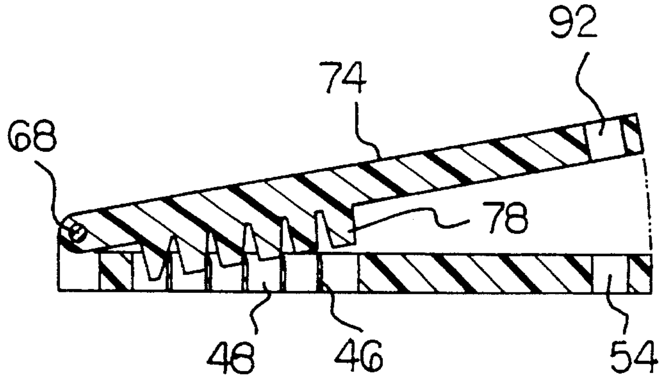
FIG. 4 is a cross sectional side view of the preferred embodiment of the present invention with the projections being positioned between the spaces of the blades. The same reference numerals refer to the same parts through the various Figures.

The border 86 covers twenty-five percent of a surface area of the plate top 72. The border has a width being one and one half inch from any end of the press plate to any one of the projections. The handle 64 of the plate 56 has a handle end 90 with a generally oblong hole 92 adjacent thereto. As illustrated in FIG. 4, the handle of the plate assists the plate in rotating at the interlocked hinges toward the base portion. When the plate is rotated towards to base portion the projections are pressed between the spaces of each blade. The projections will force a fish positioned on the base top to be chunked by the blades when the projection being forced between the spaces of each blade. The projections of the present invention are formed of the same metal that the tuna chunking apparatus is formed of.

The present invention is a tuna chunking apparatus that has a base portion, a press plate, press projections, and blades. The apparatus is formed from steel that is treated to be highly rust resistant. The apparatus functions by placing the base portion on a five gallon chum bucket. Once the base portion is placed on the bucket, a fish is placed across the top of the base portion, then the press plate is brought over to have the projections pressed against the fish. When the projection press against the fish, the fish is chunked by the blades.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tuna chunking apparatus for chunking fish into pieces comprising in combination:

a generally rectangular base portion having a base front end and a base back end with a generally rectangular handle extending therefrom, the base front end having a pair of cylindrical hinged extensions extending therefrom, the base portion having a length of about 13 inches, and a width of about 11 inches, and a height of about 3 to 4 inches, the base portion having a base top and a base bottom with a generally rectangular opening therethrough, the opening encompassing about seventy percent of the base top and the base bottom to leave a border, the border covers twenty-five percent of a surface area of the base top and the base bottom, the border having a width being 1½ inch from any end of the base portion to the opening, the base portion capable of having the base bottom positionable on a chum bucket;

the opening of the base portion having a front walls, a back wall with a pair of side walls therebetween, the side walls having six rigid blades extending therebetween, the six rigid blades having a space between each blade, one of each blade being proportionately spaced from the front wall and another blade, one of each blade being porportionately spaced from the back wall and another blade, each blade having a height extending from the base top to the base bottom with the height being equal the height of the base portion, the handle having a handle end with a generally oblong hole adjacent thereto;

a generally rectangular press plate having a plate front end and a plate back end with a generally rectangular handle extending therefrom, the plate front end having three cylindrical hinged extensions extending therefrom, the cylindrical hinged extensions of the plate capable of interlocking with the pair of cylindrical hinged extensions of the base portion and being secured thereto with a pivot pin, the press plate having a length of about 13 inches, and a width of about 11 inches, and a height of about 3 to 4 inches, the press plate having a plate top and a plate bottom, the plate top having five generally rectangular projections and a front projection extending therefrom;

each projection being proportionately spaced from another projection, the front projection being proportionately spaced from the plate front end, one of each projection being proportionately spaced from the plate back end, each of the five projections having a height of about 3 to 4 inches and a width of about 1 inch, the front projection being of equal height with each of the five projection, the front projection having a decreasing width with an interior wall sloping away from another of the five projections, the projections covering about seventy percent of the plate top leaving a border, the border covers twenty-five percent of a surface area of the plate top, the border having a width being 1½ inch from any end of the press plate to any one of the projections, the handle of the plate having a handle end with a generally oblong hole adjacent thereto, the handle of the plate capable assisting the plate in rotating at the interlocked hinges toward the base portion, whereby all of the projections being positioned between the spaces of each blade, the projection being capable of forcing a fish positioned on the base top to be chunked by the blades when the projection being forced between the spaces of each blade.

2. A tuna chunking apparatus comprising:

a base portion having a base front end and a base back end with a handle extending therefrom, the base front end having a pair of hinged extensions extending therefrom, the base portion having a base top and a base bottom with an opening therethrough, the opening being generally rectangular and encompassing approximately seventy percent of the base top and the base bottom to leave a border, the border covering approximately twenty-five percent of a surface area of the base top and the base bottom, the border having a width being 1½ inch from any end of the base portion to the opening for resting on the top of a chum bucket;

the opening of the base portion having a front wall, a back wall with a pair of side walls having six rigid blades with a space between each blade;

a press plate having a plate front end and a plate back end with a handle extending therefrom, the plate front end having three cylindrical hinged extensions extending therefrom, and capable of interlocking with the pair of cylindrical hinged extensions of the base portion, the press plate having a plate top with five generally rectangular projections and a front projection extending therefrom, each projection being proportionately spaced from another projection; and the handle of the plate capable of allowing the plate to rotate toward the base portion at the interlocked hinges, whereby the projection being capable of forcing a fish positioned on the base top to be chunked by the blades when the projection being forced between the spaces of each blade.

3. The tuna chunking apparatus as set forth in claim 2 wherein the base being generally rectangular in shape and having a length of about 13 inches, and a width of about 11 inches, the base having a height of about 3 to 4 inches with the opening having a height equal thereto.

4. The tuna chunking apparatus as set forth in claim 2 wherein each blade being formed of surgical steel and having a height extending from the base top to the base bottom with the height being equal the height of the base portion, one of each blade being proportionately spaced from the front wall and another blade, one of each blade being proportionately spaced from the back wall and another blade.

5. The tuna chunking apparatus as set forth in claim 2 wherein the handle of the base portion having a handle end with a generally oblong hole adjacent thereto and being integral the base portion.

6. The tuna chunking apparatus as set forth in claim 2 wherein the pair hinged extensions of the base portion being secured by a pivot pin to the three hinged extensions of the plate.

7. The tuna chunking apparatus as set forth in claim 2 wherein the press plate having a length of about 13 inches, and a width of about 11 inches, and a height of about 3 to 4 inches.

8. The tuna chunking apparatus as set forth in claim 2 wherein each of the five projections having a height of about 3 to 4 inches and a width of about 1 inch, the front projection being of equal height with each of the five projection, the front projection having a decreasing width with an interior wall sloping away from another of the five projections and being proportionately spaced from the plate front end, one of each projection being proportionately spaced from the plate back end, the projections covering about seventy percent of the plate top leaving a border.

9. The tuna chunking apparatus as set forth in claim 8 wherein the border covers twenty-five percent of a surface area of the plate top, the border having a width being 1½ inch from any end of the press plate to any one of the projections.

10. The tuna chunking apparatus as set forth in claim 2 wherein the handle of the plate having a handle end with a generally oblong hole adjacent thereto and being integral the press plate.

* * * * *